C. PLETSCHER AND L. C. REESE.
MASTICATOR.
APPLICATION FILED FEB. 24, 1917.

1,324,170.

Patented Dec. 9, 1919.
4 SHEETS—SHEET 1.

INVENTORS.
Carl Pletscher
Louis Charles Reese,

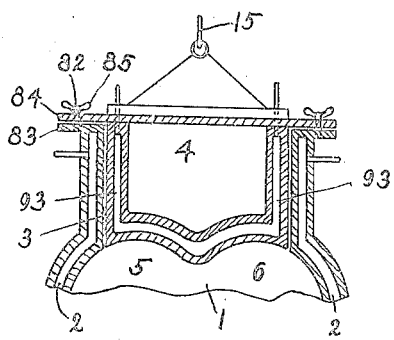
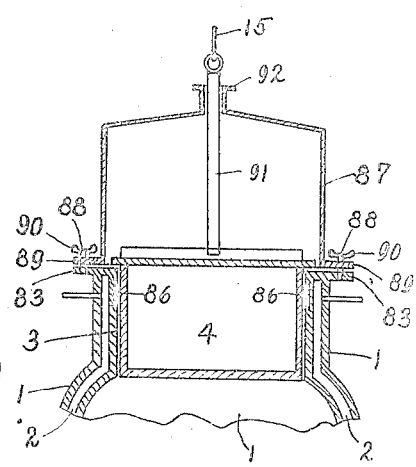
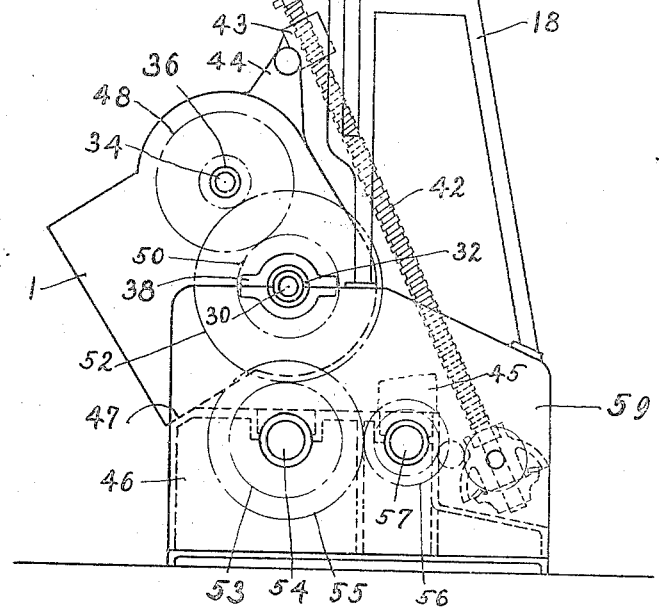

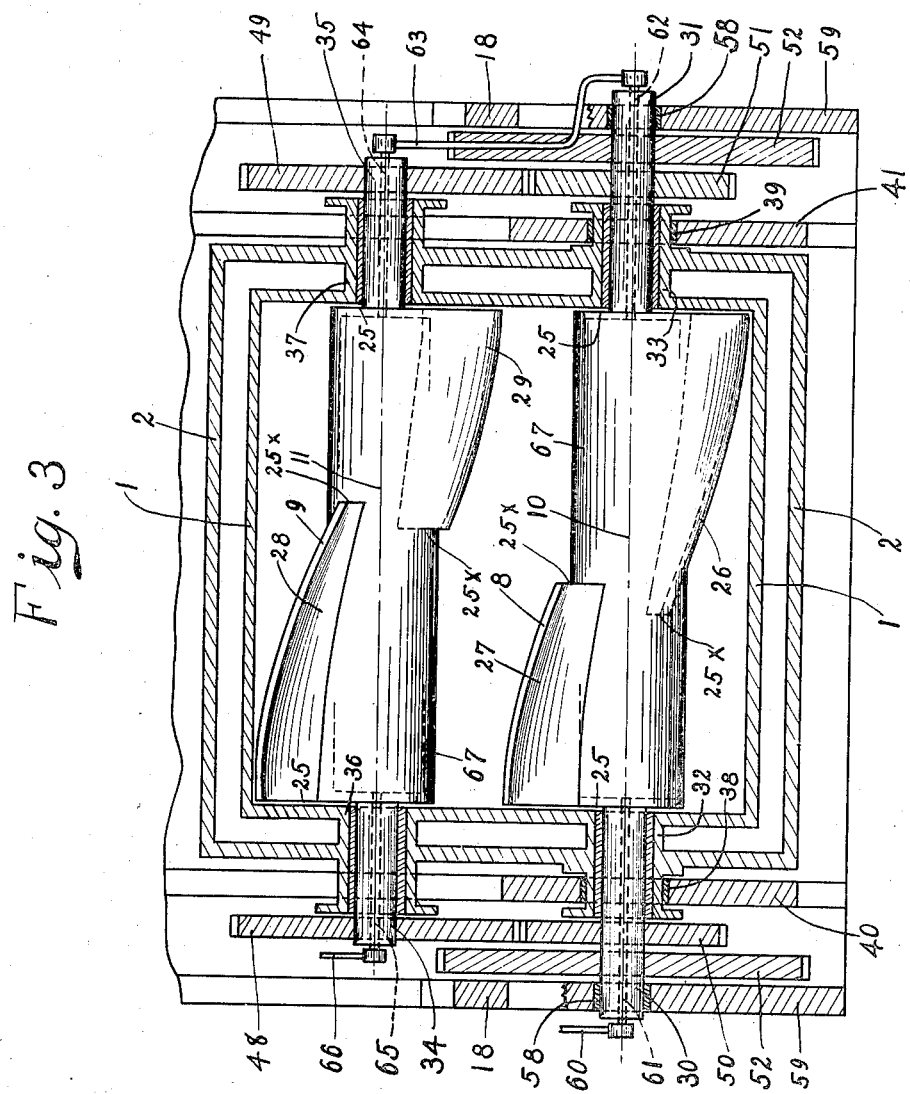

UNITED STATES PATENT OFFICE.

CARL PLETSCHER AND LOUIS CHARLES REESE, OF SAGINAW, MICHIGAN, ASSIGNORS TO WERNER & PFLEIDERER COMPANY, OF SAGINAW, MICHIGAN, A CORPORATION OF MICHIGAN.

MASTICATOR.

1,324,170.   Specification of Letters Patent.   Patented Dec. 9, 1919.

Application filed February 24, 1917. Serial No. 150,716.

*To all whom it may concern:*

Be it known that we, CARL PLETSCHER and LOUIS CHARLES REESE, both residing in the city of Saginaw, county of Saginaw, and State of Michigan, have invented new and useful Improvements in Masticators, of which the following is a specification.

This invention relates to improvements in masticators for minutely distributing and incorporating matters in other substances, solid, liquid or semi-liquid, and squeezing and kneading the mixture more or less resisting these operations, to a homogeneous mass. The object of our invention is to perform this work more efficiently, quicker and at less cost of power and labor.

The novel features, devices, arrangements, parts and combinations thereof which constitute this invention are fully explained in the following description of an example of its application, a masticator used in the preparation of rubber, which is also represented in the accompanying drawings, wherein Figure 1 is a sectional elevation of the masticator, showing the shape and arrangement of the blades and trough, the device for tilting the latter and the compression cover in working position.

Fig. 2 represents a side elevation of the same machine showing the trough tilted and the compression cover lifted, as also diagrammatically the driving gears of the blades.

Fig. 3 represents a sectional plan through the blade centers.

Fig. 10 and Fig. 11 represent special arrangements of the compression cover and upper part of the trough.

Like numerals of reference indicate corresponding parts serving the same or a similar purpose.

Figure 1:
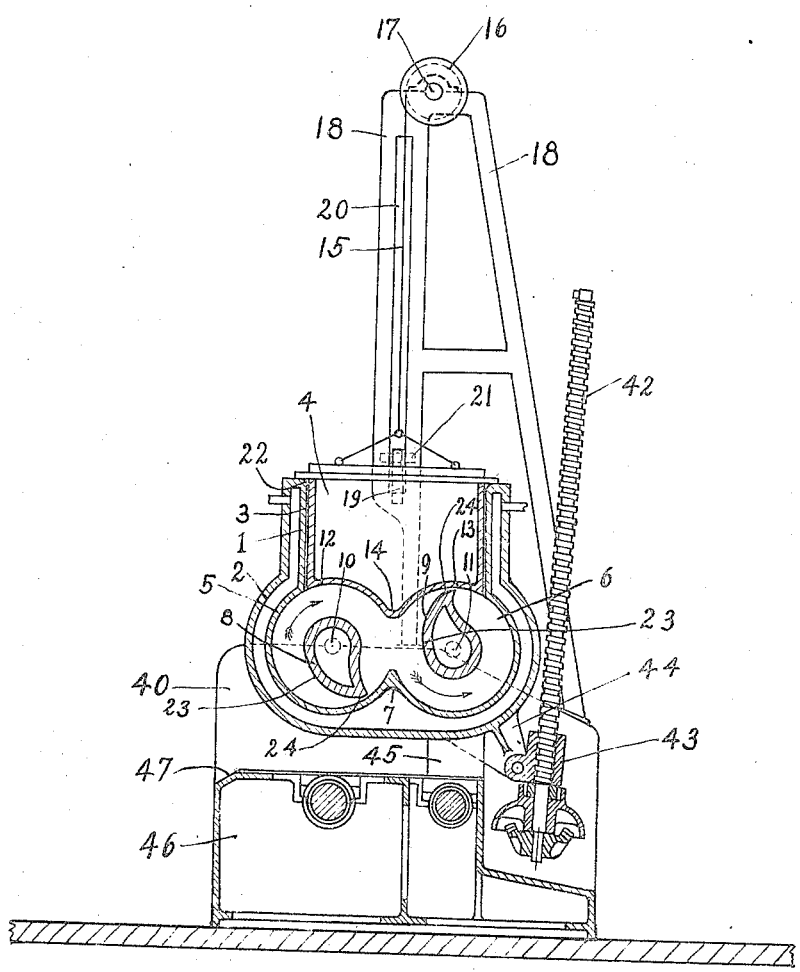

The masticator trough 1 has a shape often used in this kind of machine and is surrounded on all sides by the jacket 2 through which steam, water or any other fluid suitable and having the necessary temperature for the work may be passed. The trough 1 is charged with the materials to be treated through its upper hopper-like part 3, which, while the machine is at work, is closed by the compression cover 4, which has the purpose to keep down and break up the mass being masticated in the lower effective part containing the blades. This part in which all the mixing and kneading takes place, consists of two adjacent, parallel cylinder segments 5 and 6 meeting in the saddle 7 and ending in side walls vertical to their axis. The masticator blades 8 and 9 rotate, in order to obtain the best results, preferably in opposite directions to each other toward the inside of the trough (as indicated by the arrows) around the axes 10, and 11, which form at the same time the axes of the cylinders 5, and 6.

The compression cover 4 is of a box-like shape, slides narrowly, but easily in the hopper-like part 3 of the trough 1 and preferably follows at its bottom with part 12 the circumference of cylinder 5 and with part 13 that of cylinder 6, the parts 12 and 13 meeting in the saddle-like projection 14; in this way the active surface of the cylindrical segments 5 and 6 is considerably enlarged, and the action of the cover made more effective.

In some cases it is advisable, while the machine is in operation, to screw or clamp the rim of the compression cover 4 to the trough 1, in others to let it remain loose.

Fig. 10 represents a cross section of the cover 4 fastened to the trough 1 by means of screws 82 fixed in the flange-like top 83 of the same and passing through corresponding openings in the rim 84 of the cover 4. Between the latter and the top 83 of the trough suitable packing, rubber, asbestos, hemp or the like, is arranged, and the thumb nuts 85 running on the screws 82 serve for tightening the flanges 83 and 84.

When the compression cover 4 is loose, it acts like a floating weight resting on the mass under treatment and oscillating up and down in accordance with the changes in the pressure therein. The amount of pressure which the cover 4 exercises on the contents of the trough, is regulated according to the qualities of the ingredients and the requirements of the result to be obtained by adjusting the weight of the cover. If in this case light, powdery substances are among the ingredients being masticated, it often happens that with the air escaping from the trough during the downward movement of the cover not inconsiderable quantities of these substances are carried away and scattered over the surroundings of the machine. In order to avoid this occurrence, we place either a suitable packing 86 (Fig. 11) between the sides of the cover 4 and the hopper-like part 3, or we employ a second and lighter cover 87 high enough for the compression cover 4 to slide up and down in, and fasten it tightly to the top of the trough 1. In Fig. 11 which shows this arrangement, screws 88 are fixed in the flange-like top 83 of the trough 1 and are arranged to pass through corresponding openings in the flange-like rim 89 of the cover 87; suitable packing is placed between the flanges 83 and 89 which are tightened by the thumb nut 90 turning on the screws 88. In order to guide the compression cover 4 during its oscillations, its top part has fixed thereto the guide rods 91 sliding in the stuffing boxes 92 provided in the top of the second cover 87. After undoing the thumb-screws 90, the compression cover 4 and the secondary cover 87 are removed together by lifting them by means of the chain or steel wire 15 attached to the top of the guide rods 91.

In order to be able to heat or cool the mass in the masticating trough from all sides, the compression cover 4 may be provided with the jacket 93 (Fig. 10) through which then the same fluid of the same temperature is passed as through the jacket 2 of the trough 1.

In order to be able easily to lift the cover 4, when the trough 1 is to be charged or discharged, and to slide it again accurately and safely into its place in the hopper-like part 3, the top of cover 4 is suspended by suitable means, 15, which may be a chain, steel wire or the like, from any well known hoisting apparatus—indicated in the drawings by the wheel 16 and axle 17—supported by the top of the staging 18. The two sides of the cover 4 passing between the vertical uprights of the staging 18, are provided with luglike projections 19 sliding in the vertical slots 20 of the uprights and ending behind the same in hooks 21 preventing the lugs 19 from slipping out of the slots 20 and thus keeping the cover 4 always in its exact place. The top edges 22 of the upper part 3 of the trough 1 are rounded off and inclined toward the outside in order to allow the cover 4 easily to slide in.

The blades 8 and 9, the construction and shape of which is determined according to the requirements of the materials to be treated by means of simple calculations explained in a later paragraph of this specification, are represented in the drawings Fig. 1 and Fig. 3 to have curved working surfaces 23. The outer edges 24 of the latter revolve close to the effective walls of the cylindrical parts 5 and 6 of the trough 1 and of the bottom parts 12 and 13 of the cover 4. The ends 25 of the blades pass parallel to and close by the vertical end walls of the trough 1. The blade 8 (Fig. 3) consists of the longer part 26 and the shorter part 27 arranged on opposite sides of the hub 67 of the blade and pointing in opposite direction to each other, and the blade 9 is composed of the longer part 28 and the shorter part 29 arranged in the same way as the parts 26 and 27 of the blade 8. The blade parts 26 and 27, and 28 and 29 overlap each other, and the blades 8 and 9 are placed in the trough in such a manner that the short part of the blade 8 is adjacent to the long part of the blade 9 and vice versa. Thus the blade part 26 on the blade 8 is adjacent to the part 29 on the blade 9, and 27 on 8 to 28 on 9.

The working surfaces 23 of all parts of the blades 8 and 9 are inclined in regard to their axes 10, and 11, the foremost part of the working surface 23 always being at the trough ends of the blades and the hindmost at center ends 25* of their various parts, as is indicated in Fig. 3.

This inclination of the working surfaces of the blades, the different length, opposite arrangement and overlapping of the parts of each blade, and the working together of the longer part of the one blade with the shorter part of the other one assist greatly in the mixing of the material and the passing of same from one part to the other part of the same blade, and from one blade to the other one in the neutral zone between the saddles 7 and 14.

The blades 8 and 9 are hollow and are provided with or extended to shafts coaxial to same and passing through the side walls of the trough 1. These side walls have tube-like projections provided with bushings and so arranged as to serve as bearings for the blade shafts coaxially to the axis of the cylindrical parts 5 and 6 of the trough. The blade 8 is provided with the shafts 30 and 31 revolving in the trough projections 32 and 33 as bearings, and the blade 9 with the shafts 34 and 35 revolving in the trough projections 36 and 37.

For emptying the trough 1, it is tilted around its projections 32 and 33 turning in bearings 38 and 39 arranged on top of the supports 40 and 41 forming part of the frame work supporting the machine. The tilting of the trough is effected by turning the screw 42 by any well known means driven by hand or power and adapted to move in a plane vertical to the axis of the trough, in the sleeve 43 provided with female threads fitting the screw 42 and movably connected to the lug 44 attached to the bottom of the trough.

When the machine is at work, the trough 1 is supported at the back by the block 45 fixed to the middle part of the base 46 of the machine, and when tilted for being discharged, the trough rests with its front part on the inclined surface 47 at the upper edge of the front of this base.

The blades 8 and 9 are driven by gear wheels arranged at the shafts on both sides of the machine. The blade 9 is rotated by the gear wheels 48 and 49 fixed respectively to the shafts 34 and 35 and meshing with the gear wheels 50 and 51 attached respectively to the shafts 30 and 31 of the blade 8. It is advantageous that the front blade 8 rotates quicker than the back blade 9, as is indicated in the drawings by the gear wheels 48 and 49 of the latter being larger in diameter than the gear wheels 50 and 51 of the former.

The blade 8 is driven by the pair of gear wheels 52, 52, the one being fixed to the shaft 30 and the other one to the shaft 31, meshing with the pair of gear wheels 53, 53 attached to the countershaft 54 which latter is driven by the pair of gear wheels 55, 55 fixed to same and meshing with the gear wheels 56, 56 on the driving shaft 57. The latter is connected in the usual way to a power source either by pulleys and belting or toothed gearing.

The shafts 30 and 31 of the blade 8 run in bearings 58, 58 arranged coaxially to the bearings 38 and 39 and the cylindrical part 5 of the trough 1. The pair of bearings 58, 58 are attached to the top of the outside supports 59, 59 of the machine which are fixed to its base parallel to the supports 40 and 41 for the bearings 38 and 39. The various pairs of gear wheels 50, 51 and 52, 52 on the shafts 30 and 31 of the blade 8, and 53, 53 and 55, 55 on the countershaft 54 are arranged between the side supports 40, 59 on one side and the supports 41, 59 on the other side of the machine, which arrangement tends to distribute the driving power evenly to the blade shafts and causes the machine, though the stress on the blade shafts is very great and varying in wide limits, to run without vibration and noise.

In order to assist the jacket of the trough in communicating to the mass being masticated therein the temperature necessary for this operation, steam, water or any other fluid of the required temperature are passed through the hollow blades by means of the channels provided in their shafts and tubing connected thereto.

In Fig. 3 the fluid enters through the pipe 60 and the channel 61 in the shaft 30 into the blade 8, leaves the same through the channel 62 in the shaft 31 and passes through the pipe 63 connecting the channel 62 with the channel 64 in the shaft 35 into the blade 9, leaving the latter through the channel 65 in the shaft 34 and the tube 66 attached thereto. The tubes 60, 63 and 66 are joined to the shafts 30, 31 and 35 by suitable means usually employed in such cases for keeping the tubes in rigid position while the shafts are rotating.

The success of the intermingling and incorporating within each other of the various materials to be combined to a homogeneous mass in the masticator depends chiefly on the size and shape of the working surface of the blades. It is well known that a squeezing action, as required in the masticator, can only be attained when the working surfaces of the devices between which the squeezing takes place, form an acute angle with each other. This principle had to be and has been always employed in this class of machines. But we have now discovered that the working surface of the blade is the largest, and its effect the highest, when this working surface starts directly at the hub of the blade, and when, in a plane vertical to the axis of the blade, a tangent drawn at any point of the working surface forms an acute angle with the tangent drawn on the circle, in which the blade tips circulate while at work, at the point in which this circle is crossed by the vertical line drawn through the said point of the working surface on the line passing through the starting point of the latter at the hub of the blade and the axis of the latter, this angle never being less acute at any point of the whole length of the cross section of the working surface than that formed in the same way for that starting point of the latter. The active surface 80 (Fig. 4) of the cylindrical part of the trough in which the blade revolves, is always concentric to the circle 73 which the tips of the blade describe during its revolutions. We prefer to construct the hub 67 circular as shown in the drawings, but any other shape is allowable, as long as the entrance into the space between the starting point of the blade and the cylindrical part of the trough in which it revolves, is not obstructed thereby. We usually construct the back 81 of the blade in a line slightly curved inward. Also a straight line or any other line may be used, as long as it is not liable to form pockets at the back of the blades in which material might settle and remain untreated.

In Figs. 4-7, 67 designates the hub, 68 the starting point and 69 the tip of the working surface 70 of the blade, 71 the line passing through its axis 10 and the starting point 68 of the blade, and 72 is the tangent on the blade circle 73, which the tips 69 of the working surface 70 describe.

Figure 4:
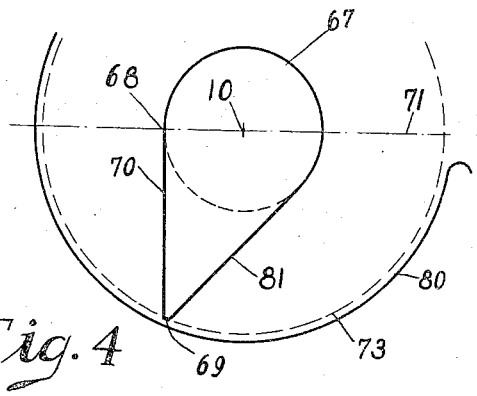
Figs. 4–9 are diagrammatical sections of various blades in a plane vertical to their axes showing the method of determining the shape of their active surface.
Figure 5:
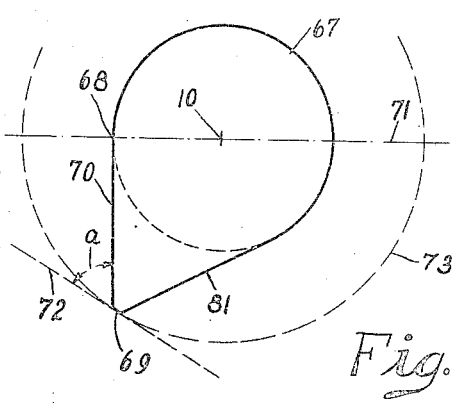
Figure 6:
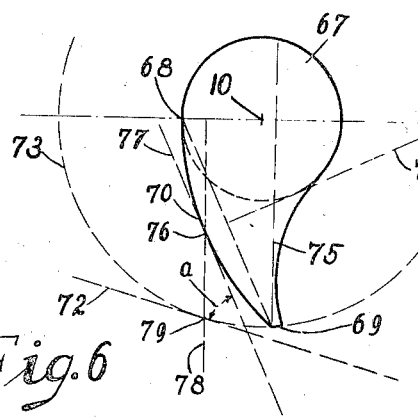
Figure 7:
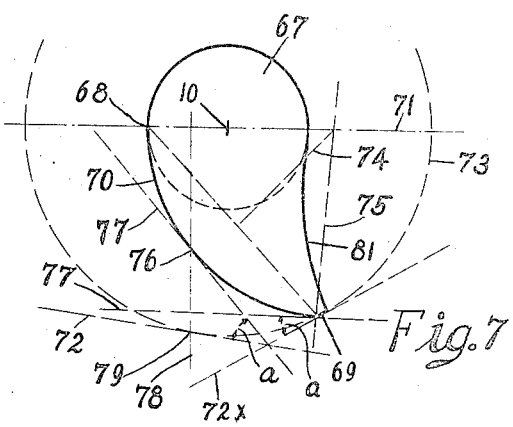
Figure 8:
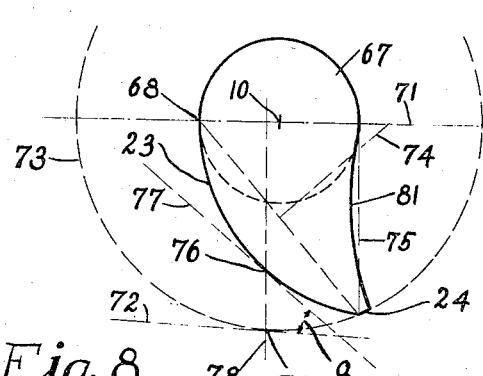
Figure 9:
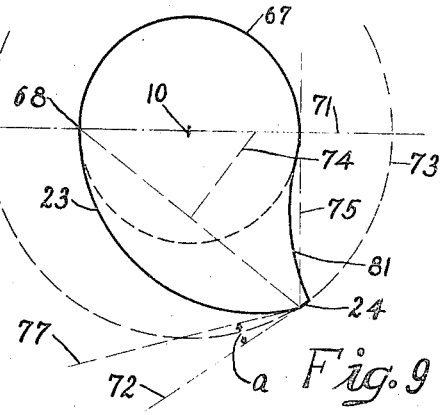

Fig. 4 and Fig. 5 represent the simplest case, the cross section of the working surface 70 of the blade forming a straight line. The angle this surface forms with the tangent 72 is the more acute, the more the starting point 68 moves away from the axis 10.

Any curve may be employed for the working surface of the blade as long as it complies with the above conditions. We found the most effective curve to be the segment of a circle the center 74 of which is situated on the line 71 passing through the axis 10 and the starting point 68 of the working surface. Fig. 6, 7, 8 and 9 represent this case, Figs. 6 and 7 in a general way, and Figs. 8 and 9 the blade shown in Fig. 1 where a vertical line 75 drawn from the tip 24 of the working surface 23 on the line 71 meets the latter at the same distance from the axis 10 as the starting point 68 of the surface 23 is distant therefrom. In the Figs. 6–9, 76 is the contact point of the tangent 77 drawn on the working surface, 78 the vertical on the line 71 passing through point 76, and 79 the point in which the tangent 72 touches its circle. These drawings explain themselves and show that the angles of the working surface and the active surface of the cylinders become gradually the more acute, the more the starting point of the working surface of the blade is removed from the axis of the latter, and from the center of the circle a segment of which forms the cross section of this working surface.

I claim:—

1. In a masticator, the combination with a trough consisting of a lower cylindrical mixing and an upper hopper-like part, of blades rotated coaxially in the said cylindrical part for working the mass therein, of a boxlike cover shaped and adapted to slide with its side walls in the hopperlike part, of projections attached to the sides of the said cover vertically to the axis of the cylindrical part, of a staging fixed to the side frame work of the machine, of means for raising the said cover up and down to the top part of this staging, of slots provided in the vertical uprights of the said staging for the side projections of the said cover to slide in, and of means for tilting the trough.

2. In a masticator, the combination with a trough consisting of a lower cylindrical mixing and an upper hopper-like part, of blades arranged coaxially with the said cylindrical part, of gearing fixed at the shafts of either end of these blades for rotating same, of a screw rod rotated by gearing mounted in the back base of the machine and adapted to move in a plane vertical to the axis of the trough for lifting same around the front blade axle, of a sleeve provided with female threads running on the said screw rod and movably connected to a lug fixed to the back of the trough bottom, of stops arranged at the back part of the base to support the machine when at work, and at the front of the same when tilted, of a box-like cover shaped and adapted to slide in the said hopper-like part and adjustable in regard to its weight, of projections attached to the sides of said cover, of a staging fixed at the side framework of the machine, of means for hoisting the said cover up to the top part of this staging, of slots provided in the vertical uprights of the said staging for the side projections of the said cover to slide in, and of hooks fixed to the ends of these projections for gripping behind the said vertical uprights.

3. In a masticator, the combination with a trough consisting of a lower cylindrical mixing and an upper hopper-like part, of blades rotating in the former, of a box-like cover shaped and adapted to slide in the said hopperlike part, of a flange-like top of the latter, of a flange-like rim of the former, of screws to connect these flanges, of projections attached to the sides of the said cover vertically to the axis of the cylindrical part, of a staging fixed to the side frame-work of the machine, of means for raising the said cover up to the top of this staging, of slots provided in the vertical uprights of the said staging for the side projections of the said cover to slide in, and of means for tilting the trough around the front blade shaft.

4. In a masticator, the combination with a trough consisting of a lower cylindrical mixing and an upper hopperlike part, of blades rotating in the former, of a box-like cover shaped and adapted to slide in the said hopper-like part, of packing arranged between the sides of the latter and of the said cover, of projections attached to the sides of the said cover vertically to the axis of the cylindrical part, of a staging fixed to the side frame-work of the machine, of means for raising the said cover up to the top of this staging, of slots provided in the vertical uprights of the said staging for the side projections of the said cover to slide in, and of means for tilting the trough around the front blade shaft.

5. In a masticator, the combination with a trough consisting of a lower cylindrical mixing and an upper hopper-like part, of blades rotating in the former, of a box-like cover shaped and adapted to slide in the said hopper-like part, of a second and lighter lid of a width and height sufficient for the said cover to slide up and down in, of a flange-like top of the said hopperlike part, of a flangelike rim of the second lid and of screws to connect these two flanges.

6. In a masticator, the combination with a trough consisting of a lower cylindrical mixing and an upper hopper-like part, of blades rotating in the former, of a boxlike cover shaped and adapted to slide in the said hopper-like part and following at its bottom the circle described by the tips of the rotating blades, of a flange-like top of the said hopper like part, of a flange-like rim of the said cover and of screws to connect these flanges.

7. In a masticator, the combination with a trough consisting of a lower cylindrical mixing and an upper hopper-like part, of blades rotating in the former, of a box-like cover shaped and adapted to slide in the said hopper-like part and following at its bottom the circle described by the tips of the rotating blades, and of packing arranged between the sides of the said hopper-like part and of the said cover.

8. In a masticator the combination with a trough consisting of a lower cylindrical mixing and an upper hopperlike part, of blades rotating in the former, of a boxlike cover shaped and adapted to slide in the said hopper-like part and following at its bottom the circle described by the tips of the rotating blades, of a second and lighter lid of a width and height sufficient for the said cover to slide up and down in, of a flange-like top of the said hopper-like part, of a flange-like rim of the second lid, and of screws to connect these two flanges.

9. In a masticator, the combination with a trough consisting of a lower cylindrical mixing and an upper hopper-like part, of blades rotating in the former, of a boxlike cover shaped and adapted to slide in the said hopperlike part, of a second and lighter lid of a width and height sufficient for the said cover to slide up and down in, of a flange-like rim of the second lid, of screws to connect these two flanges, of guide-rods attached to the upper part of the said box-like cover, of stuffing boxes arranged in the top of the said second lid for the said guide rods to slide in, and of means for lifting the said box-like cover and the said second lid simultaneously.

10. In a masticator, the combination with a trough consisting of a lower cylindrical mixing and an upper hopper-like part, of blades coaxially rotating in the former, following with their outer edges closely the inner, active surfaces of the same and having working surfaces starting at the hubs of the blades and being in any plane vertical to the axis of the latter of such a cross section that a tangent drawn to any point thereof forms an acute angle with the tangent drawn to the circle, in which the blade tips circulate, at the point, where this circle is crossed by the vertical line drawn through the said point of the working surface on the line passing through its starting point and the axis of the blade, this angle never being less acute at any point of the whole length of the said cross section than that formed in the same way for the starting point of the said working surface, of a box-like cover shaped and adapted to slide in the said hopper-like part, of projections attached to the sides of the said cover vertically to the axis of the cylindrical part, of a staging fixed to the side frame-work of the machine, of means for raising the cover up to the top part of this staging and of slots provided in the vertical uprights of the latter for the side projections of the said cover to slide in.

11. In a masticator, the combination with a trough consisting of a lower cylindrical mixing and an upper hopper-like part, of blades coaxially rotating in the former, following with their outer edges closely the inner active surfaces of the same and having working surfaces starting at the hubs of the blades and being in any plane vertical to the axis of the latter of such a cross section that a tangent drawn to any point thereof forms an acute angle with the tangent drawn to the circle in which the blade tips circulate, at the point where this circle is crossed by the vertical line drawn through the said point of the working surface on the line passing through its starting point and the axis of the blade, this angle never being less acute at any point of the whole length of the said cross section than that formed in the same way for the starting point of the said working surface, of a box-like cover shaped and adapted to slide in the said hopper-like part, of a flange-like top of the latter, of a flange-like rim of the former and of screws to connect these flanges.

12. In a masticator, the combination with a trough consisting of a lower, cylindrical mixing and an upper hopper-like part, of blades coaxially rotating in the former, following with their outer edges closely the inner, active surfaces of the same and having working surfaces starting at the hub of the blades and being in any plane vertical to the axis of the latter of such a cross section that a tangent drawn to any point thereof forms an acute angle with the tangent drawn to the circle in which the blade tips circulate, at the point where this circle is crossed by the vertical line drawn through the said point of the working surface on the line passing through its starting point and the axis of the blade, this angle never being less acute at any point of the whole length of the said cross section than that formed in the same way for the starting point of the said working surface, of a boxlike cover shaped and adapted to slide in the said hopper-like part, and of packing arranged between the sides of the latter and of the said cover.

13. In a masticator, the combination with a trough consisting of a lower, cylindrical mixing and an upper hopper-like part, of blades coaxially rotating in the former, following with their outer edges closely the inner, active surface of the same and having working surfaces starting at the hub of the blades and being, in any plane vertical to the axis of the latter, of such a cross section that a tangent drawn to any point thereof forms an acute angle with the tangent drawn to the circle in which the blade tips circulate, at the point where this circle is crossed by the vertical line drawn through the said point of the working surface on the line passing through its starting point and the axis of the blade, this angle never being less acute at any point of the whole length of the said cross section than that formed in the same way for the starting point of the said working surface, of a boxlike cover shaped and adapted to slide in the said hopper-like part, of a second and lighter lid of a width and height sufficient for the said box-like cover to slide up and down in, of a flange-like top of the said hopper-like part, of a flange-like rim of the second lid, and of screws to connect these two flanges.

14. In a masticator, the combination of a trough consisting of a lower cylindrical mixing and upper hopper-like part, of a jacket surrounding the bottom and four sides of the trough for tempering fluid imparting to the mass therein the required temperature, to pass through, of blades rotating coaxially with the cylindrical parts, following with their outer edges the circular active surface of the latter and having working surfaces starting at their hubs having in any plane vertical to the blade axis a cross section of such a shape that a tangent drawn at any point thereof in the said plane forms an acute angle with the tangent drawn to the circle in which the blade tips circulate, at a point where this circle is crossed by a vertical line drawn through the said point of the working surface on the line passing through the said starting point of the latter and the axis of the blade, this angle never being less acute than that formed in the same way for the starting point of said working surface, of side projections of the trough for the blade shafts to run in, of bearings fixed to the top of the side frame work of the machine for the front side projections of the trough, to turn in coaxially to the front blade shafts, and of means for tilting the trough on the said side projections.

15. In a masticator, the combination of a trough consisting of a lower cylindrical mixing and upper hopperlike part, of a jacket surrounding the bottom and four sides of the trough for tempering fluid imparting to the mass therein the required temperature, to pass through, of hollow blades rotating coaxially with the cylindrical part following with their outer edges the circular active surface of the latter and having working surfaces starting at their hubs and shaped so that, in any cross section of the same in a plane vertical to the blade axis, a tangent drawn to any point thereof forms an acute angle with the tangent drawn in the same plane to the circle in which the blade tips circulate, at the point where this circle is crossed by the vertical line drawn through the said point of the working surface on the line passing through its starting point and the axis of the blade, this angle never being less acute at any point of the whole length of the said cross section than that formed in the same way for the starting point of the said working surface, of shafts coaxially attached to each end of the blades and provided with channels, of tubes connected to these channels and leading through same and the hollow blades tempering fluids for the same purpose as they pass through the jacket of the machine, and of a box-like cover sliding in the said hopper-like part, adjustable in regard to weight and provided with hollow walls for the tempering fluid to pass through.

CARL PLETSCHER.
LOUIS CHARLES REESE.